United States Patent [19]

Martin

[11] 4,361,892

[45] Nov. 30, 1982

[54] ADAPTIVE EQUALIZER

[75] Inventor: Gary D. Martin, Andover, Mass.

[73] Assignee: Bell Telephone Laboratories, Incorporated, Murray Hill, N.J.

[21] Appl. No.: 203,646

[22] Filed: Nov. 3, 1980

[51] Int. Cl.³ .............................................. H04B 3/14
[52] U.S. Cl. ........................................ 375/14; 375/16; 333/18; 328/15
[58] Field of Search .................. 375/11, 12, 14, 16; 333/18, 28 R; 364/724, 825; 328/15

[56] References Cited

U.S. PATENT DOCUMENTS

| | | | |
|---|---|---|---|
| 3,324,251 | 6/1967 | Sichak | 333/18 |
| 3,444,468 | 5/1969 | Drouilhet | 333/18 |
| 3,633,129 | 1/1972 | Kao | 333/18 |
| 3,742,360 | 6/1973 | Ragsdale | 333/18 |
| 3,990,010 | 11/1976 | Bennett | 375/16 |

Primary Examiner—Benedict V. Safourek
Assistant Examiner—Stephen Chin
Attorney, Agent, or Firm—S. Sherman

[57] ABSTRACT

An adaptive equalizer is disclosed comprising an amplitude equalizer circuit (12) having an adjustable Q, and a plurality of all-pass circuits (14,15) having adjustable delay bumps. A controller (18) adjusts the tuning, magnitude of the bumps, and the number of all-pass networks in the equalizer in response to variations in the power within a plurality of spectrum samples and the bit error rate of the equalizer output signal.

7 Claims, 5 Drawing Figures

ADAPTIVE EQUALIZER

TECHNICAL FIELD

This invention relates to signal equalizers and, in particular, to adaptive fade equalizers.

BACKGROUND OF THE INVENTION

It has been found that amplitude and delay distortion resulting from multipath fading can, under certain conditions, be a major cause of transmission deterioration in both digital and FM radio communications systems. Experimental and analytical evidence indicate that outages of wideband digital systems, caused by this phenomenon (i.e., selective fading), may exceed system performance objectives. This means that techniques for handling flat fades, such as AGC, will not be adequate to maintain satisfactory wideband digital transmission, and that additional correction will be required. Even the use of space diversity techniques will not eliminate the problem associated with selective fading. The use of some form of equalization will still be required to achieve the desired level of system performance, (see the copending application, Ser. No. 57,748, filed July 16, 1979, and assigned to applicant's assignee).

The problem, however, is that signal fading resulting from multipath transmission is basically unpredictable. Accordingly, the compensation introduced by a fade equalizer must be capable of automatically adapting to the changing signal conditions. One such adaptive equalizer is disclosed by H. Miedema in his copending application Ser. No. 158,404, filed June 11, 1980.

However this equalizer will not provide delay equalization in the case of nonminimum phase fades.

SUMMARY OF THE INVENTION

An adaptive equalizer in accordance with the present invention includes an amplitude equalizer circuit (i.e., resonant circuit) having an adjustable Q, and a plurality of all-pass circuits having adjustable delay bumps. The resonant circuit provides amplitude equalization. Together, the all-pass circuits and the amplitude equalizer provide delay equalization. In the illustrative embodiment described hereinbelow, the natural frequencies of the resonant circuit and the all-pass circuits remain fixed. Tuning is accomplished by placing the equalizer within an up/down frequency conversion network, and varying the frequency of the local oscillator coupled to the converters. A control circuit adjusts the equalizer in response to the bit error rate and to variations in the signal power within a plurality of spectrum samples of the equalized signal.

DETAILED DESCRIPTION

Figure 1:
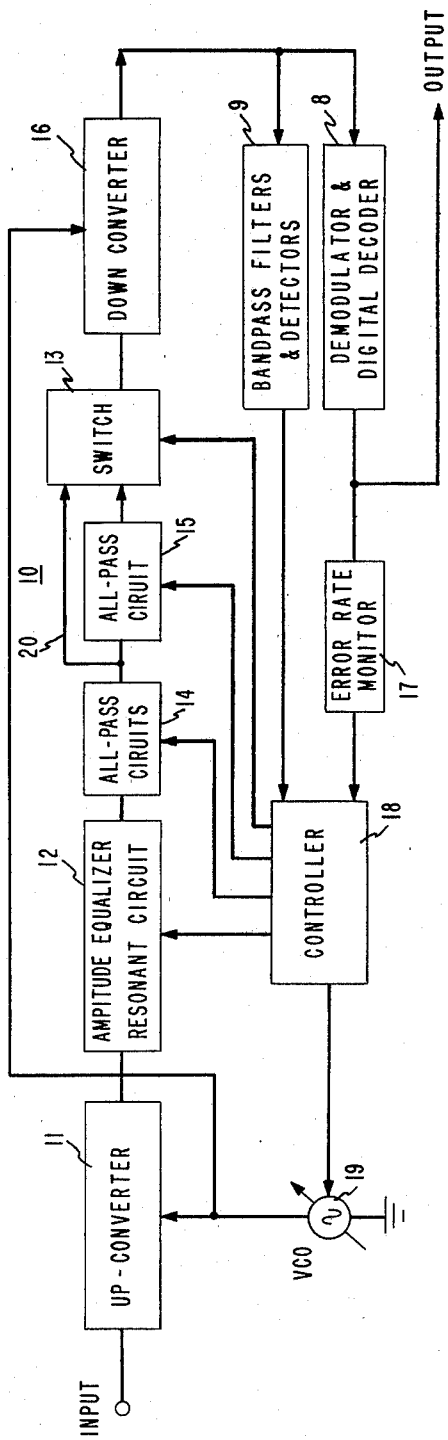
FIG. 1 shows, in block diagram, an adaptive equalizer in accordance with the present invention.

Referring to the drawings, FIG. 1 shows in block diagram an adaptive equalizer 10 in accordance with the present invention. Amplitude and phase equalization are provided by means of a resonant circuit 12 having an adjustable Q, and a plurality of n+1 all-pass circuits 14 and 15, each of which has an adjustable delay. n of the all-pass circuits are represented by 14. The n+1st circuit is represented by 15. The latter is adjusted so that its peak delay occurs at the resonant frequency of the amplitude equalizer 12. The peak delays of the remaining n all-pass circuits 14 are symmetrically distributed about the frequency of circuit 15 so as to be uniformly distributed over the band of interest. The magnitude of the delay introduced by each of the several delay circuits is adjusted in response to changing fade conditions as will be explained in greater detail hereinbelow. For reasons that will also be described hereinbelow, a switch 13 and a bypass path 20 are included to provide a shunt signal path around all-pass circuit 15.

With the natural frequencies of circuits 12, 14 and 15 fixed, tuning is affected by placing the resonant circuit and the all-pass circuits within an up/down frequency conversion network comprising a first frequency converter 11 at the input end of the equalizer, and a second frequency converter 16 at the output end. For purposes of illustration, converter 11 is designated an up-converter and converter 16 is designated a down-converter. However, it is evident that a down/up arrangement can just as readily be used.

A tunable local oscillator 19 supplies a variable frequency signal to both converters. Thus, tuning is accomplished by varying the spectral composition of the signal band relative to the fixed frequencies of circuits 12, 14 and 15.

A controller 18, which can be a programmable microprocessor or hard wired logic circuits, adjusts the equalizer circuits in response to variations in the signal power within the transmission band, obtained by sampling the signal spectrum at a plurality of different frequencies, and variations in the bit error rate of the output signal.

The signal power measurements are made by means of bandpass filters and detectors network 9 located at the output of the down-converter 16. The error rate is measured by means of an error rate monitor 17 which samples the information signal at the output of a demodulator and digital decoder 8.

Figure 2:
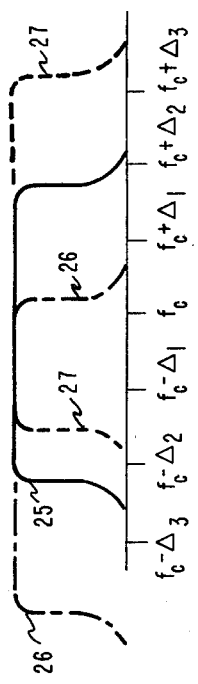
FIG. 2 shows the distribution of the natural frequencies of the amplitude and delay equalizer circuits.

FIG. 2 shows the distribution of the natural frequencies of the amplitude and delay equalizer circuits, and three different tuning conditions of the signal band. For purposes of illustration, seven all-pass circuits are indicated. Solid curve 25 shows the center of the signal band aligned with $f_c$, the natural frequency of both the amplitude equalizer and all-pass circuit 15. The natural frequencies $f_c \pm \Delta_1$, $f_c \pm \Delta_2$ and $f_c \pm \Delta_3$ of the remaining six all-pass circuits are symmetrically disposed with respect to $f_c$. Broken curves 26 and 27 show the signal band for two different tunings of the local oscillator 19. As can be seen, shifting the signal relative to the natural frequencies of the equalizing circuits is the equivalent of tuning the respective circuits relative to the signal.

Before proceeding with a detailed discussion of the operation of the equalizer, some general observations relating to multipath fading may be helpful. For example, it has been found that the distortion caused by multipath fading for a typical microwave signal of interest can be represented by a simple model having two or three paths. In a two-path model, the transmission channel includes a direct path between the transmitter and receiver, and an indirect path. Thus, the total received signal y(t) includes a direct path component ax(t) and an indirect path, delayed component bx(t−τ). It can be readily shown that if a>b, the transmission channel is a so-called "minimum phase shift network." If, however, the amplitude of the delayed signal component is greater than the direct path component (i.e., b>a), nonminimum phase transmission results. (For a discussion of minimum phase shift networks, see "Network Analysis and Feedback Amplifier Design" by H. W. Bode, published by D. Van Nostrand Company, Inc., of N.Y., Fourth Printing, pp. 242 et seq.) The importance of this distinction will become apparent in the discussion that follows.

A fade notch occurs when the two received signal components destructively interfere. If the resulting fade notch falls outside the frequency band of interest, or if the fade is "minimum phase," the use of the all-pass circuits is not required. This so because the phase distortion produced by fading is confined primarily to a small frequency band about the fade notch. Thus, phase correction is not required when the notch falls outside the band of interest. When the fade is within the band and is minimum phase, the minimum phase response associated with the amplitude equalizer simultaneously provides the required phase compensation.

If, however, the fade falls within the band of interest and is nonminimum phase, the effect of the amplitude equalization is to double the phase distortion. Thus, in this latter case, phase equalization by means of the all-pass circuits is advantageously provided.

While the amplitude characteristic of the transmission channel can be determined by monitoring the power spectrum of the received signal, the phase (i.e., delay) response of the channel cannot be determined directly in this manner. However, it can be inferred from the equalizer output. Thus, if the amplitude response has been equalized by the resonant circuit, then the remaining signal distortion gives a measure of the delay distortion. Accordingly, the amplitude correction is made first. Following this, the bit error rate, or eye closure is examined to determine the degree of delay equalization required.

The difficulty with the operation described above resides in the fact that when the all-pass circuits are inserted into the equalizer, as is required in the nonminimum phase case, the added delay they introduce produces gaps in the data stream. These gaps occur at random intervals, as a function of the fade conditions, and constitute a disruption to the orderly operation of the network. To avoid this, the equalizer in accordance with the present invention is operated such that the effective number of all-pass circuits included in the signal path is maintained constant at all times. For example, with the fade notch within band, the controller adjusts the frequency of the local oscillator so that the amplitude equalizer peak is aligned with the fade notch. This also aligns the midband all-pass circuit with the fade notch. In the nonminimum phase case, the amplitude equalizing circuit 12 introduces added delay that is the equivalent of the delay contributed by one all-pass circuit. Hence for this case, all-pass circuit 15 is switched out of the circuit, and delay compensation over the signal band is provided by the remaining n all-pass circuits 14. The net delay, however, is equivalent to the delay of n+1 all-pass circuits.

In the minimum phase case, the amplitude equalizer cancels the phase dispersion around the fade notch. To compensate for this, all-pass circuit 15 is switched into the circuit so as to again provide the delay of n+1 all-pass circuits. While this maintains a constant total delay through the equalizer, thus avoiding the previously-mentioned gaps in the data stream, it does have the disadvantage of introducing some delay distortion in the minimum phase case.

Figure 3:
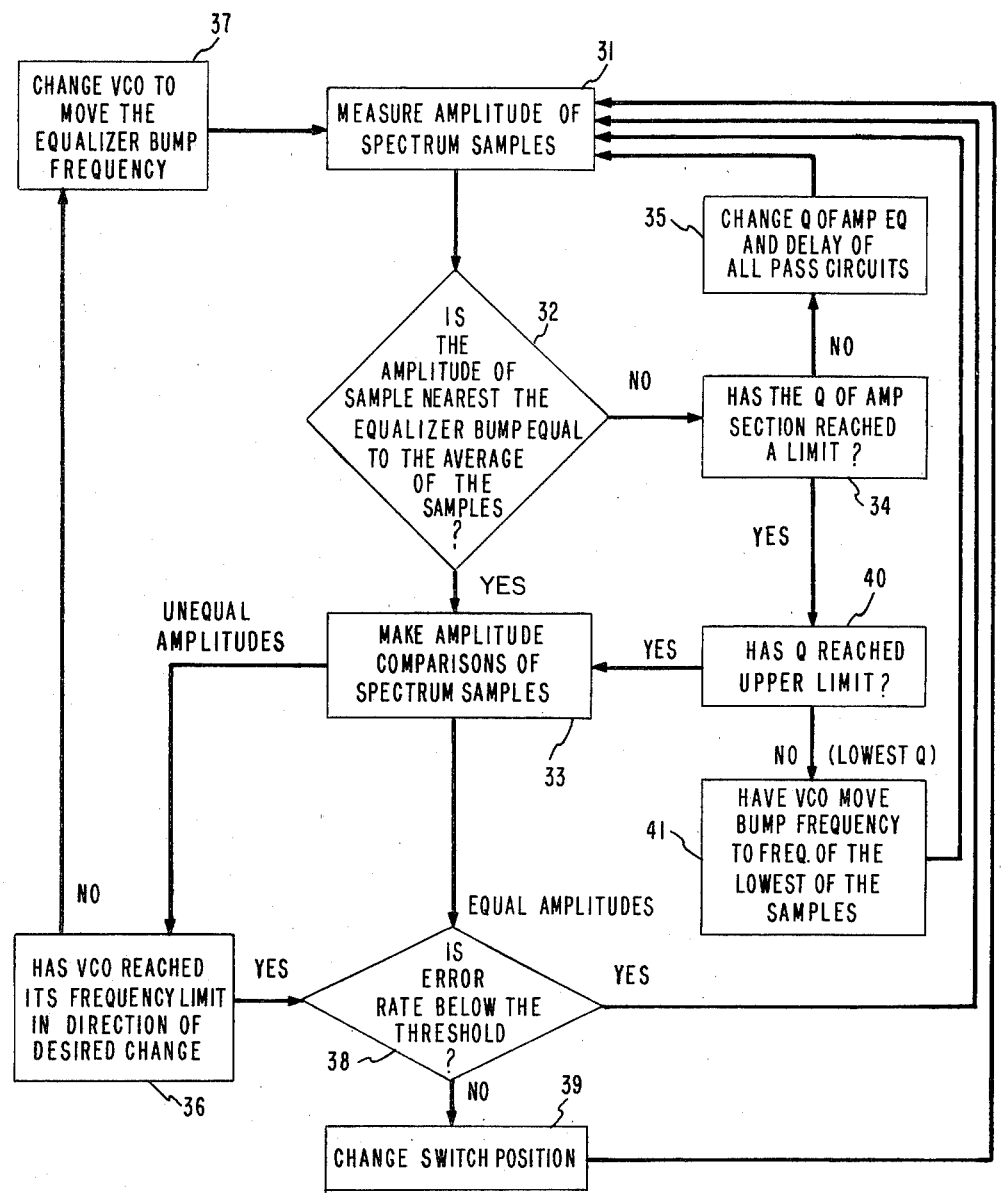
FIG. 3 shows a flow diagram of the control algorithm.

FIG. 3, now to be considered, shows a flow diagram of the control algorithm implemented by controller 18. As indicated in FIG. 1, one of the inputs to the controller is the power spectrum samples derived from bandpass filters and detectors network 9. The relative amplitudes of these samples are a function of the locations and magnitudes of the fade notch and the amplitude equalizer bump. A measure of this is obtained by determining whether the amplitude of the spectrum sample nearest the equalizer bump is equal to the average of the magnitudes of all the other samples (32). If it is not, the controller determines if the Q of the amplitude equalizer circuit has reached its limit in the direction of desired change (34). If NO, the controller causes the Q of resonant circuit 12, and the magnitude of the delay bumps of the all-pass circuits 14 and 15 to change (35). As these parameters are changing, the controller continues to monitor the magnitudes of the spectrum samples (31) until the Q of the amplitude equalizer reaches its upper limit, or the magnitude of the spectrum sample nearest the equalizer bump equals the average of all the other samples. When either condition is reached, the controller proceeds to make amplitude comparisons between pairs of samples (33). To illustrate this operation, a number of illustrative situations are now considered.

EXAMPLE 1

The fade notch is within the band and the amplitude equalizer bump is tuned two or more samples away.

In this case, it may not be possible to make the sample nearest the amplitude bump equal to the average of the other samples. Instead, the controller will cause the equalizer Q to reach one of its limiting values (34). Specifically, it will reach its lower limit (40) and the amplitude bump will be shifted to the frequency of the lowest sample (41).

EXAMPLE 2

The amplitude bump and the fade notch are nearest the lowest frequency sample, and it is possible to make the lowest frequency sample equal to the average of the other samples (32).

To then determine the direction in which to move the amplitude bump, amplitude comparisons between pairs of samples are made (33). Using five samples as an example (i.e., five samples within band), amplitude tests are made as a function of the location of the amplitude equalizer bump (i.e. resonant frequency) relative to the sample frequency, as set forth in table below.

Table I

TABLE I

| WITH EQUALIZER BUMP NEAREST SPECTRUM SAMPLES | TEST 1 | IF SAMPLES IN TEST 1 ARE EQUAL, MAKE TEST 2 |
|---|---|---|
| 1 | $5 \stackrel{?}{=} 2$ | — |
| 2 | $1 \stackrel{?}{=} 5$ | $1 \stackrel{?}{=} 3$ |
| 3 | $1 \stackrel{?}{=} 5$ | $2 \stackrel{?}{=} 4$ |

TABLE I-continued

| WITH EQUALIZER BUMP NEAREST SPECTRUM SAMPLES | TEST 1 | IF SAMPLES IN TEST 1 ARE EQUAL, MAKE TEST 2 |
|---|---|---|
| 4 | $1 \stackrel{?}{=} 5$ | $3 \stackrel{?}{=} 5$ |
| 5 | $4 \stackrel{?}{=} 1$ | — |

The tests are conducted as follows. The magnitude of the spectrum sample to the left of the $\stackrel{?}{=}$ sign is compared to that of the sample on the right. If the amplitude of the sample to the left of the $\stackrel{?}{=}$ sign is less than that of the sample to the right, the oscillator frequency is changed such that the equalizer amplitude bump frequency is decreased with respect to the signal. If the sample to the left of the $\stackrel{?}{=}$ sign is greater than the sample on the right, then the oscillator frequency is changed such that the equalizer bump frequency is increased.

In Example 2, since the equalizer bump is nearest sample 1, samples 5 and 2 are compared. If they are equal, within the resolution capability of the comparison circuit, no further test is required. If, however, sample 5 is less than sample 2, the local oscillator frequency is changed so as to decrease the bump frequency. After decreasing the bump frequency, and readjusting the Q of the amplitude equalizer and delay of the all-pass circuits, the amplitude test is repeated.

EXAMPLE 3

Q limit not reached and the equalizer bump nearest to sample 2.

In this case, a comparison is made between samples 1 and 5. If they are equal, samples 1 and 3 are compared. If 1 is found to be greater than 3, the bump frequency is increased.

The process described above continues as outlined in TABLE I with additional testing of the value of the sample nearest the bump relative to the average of the magnitudes of all the other samples. If the oscillator reaches the limit of its range (36), or the amplitudes of the spectrum samples are equal, the error rate is then examined to ascertain if it is below a specified threshold (38). If it is, no further action is taken and the above-described monitoring and adjusting continue to accommodate changing signal conditions. If the error rate is greater than the specified threshold, the position of switch 13 is changed (39). The purpose here is to remove all-pass circuit 15 from the equalizer in the non-minimum phase case, and to insert it into the circuit in the minimum phsae case for the reasons explained hereinabove.

Figure 4:
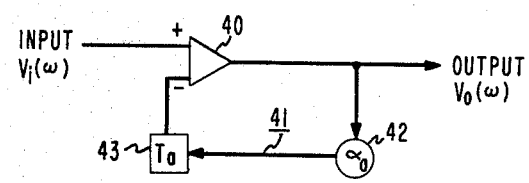
FIG. 4 is an illustrative amplitude equalizer circuit.
Figure 5:
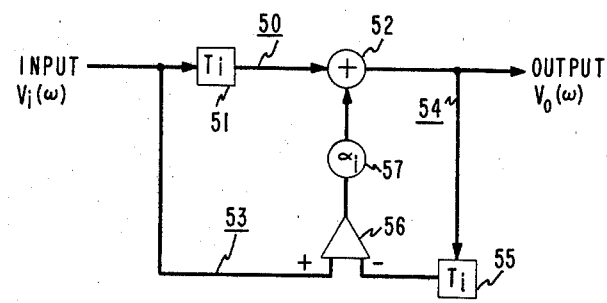
FIG. 5 is an illustrative delay equalizer circuit.

FIGS. 4 and 5 show illustrative embodiments of an amplitude equalizer circuit, and an all-pass circuit, respectively. Referring to FIG. 4, the amplitude equalizer comprises a differential amplifier 40, and a feedback path 41. The latter, including a delay line 43 and an attenuator 42, is connected between the output of amplifier 40 and its negative input port. The input signal is connected to the amplifier's positive input port.

The transfer function, $H(\omega)$, of such a circuit is given by $$H(\omega) = \frac{V(\omega)_{out}}{V(\omega)_{in}} = \frac{1}{1 + \alpha_a e^{-j\omega T_a}} \tag{1}$$

where $T_a$ is the delay in the feedback path; and
$\alpha_a$ is the attenuator gain factor ($\alpha_a < 1$).

The circuit has a resonant peak at $\omega = \pi/T$. The magnitude of the peak varies as a function of $\alpha_a$. The peak minimum phase delay of the amplitude equalizer is $$(\tau_a)_{max} = \frac{\alpha_a T_a}{1 - \alpha_a} \tag{2}$$

Thus, during a nonminimum phase fade, with $\alpha_a$ set to flatten the amplitude response within band, this delay adds to the signal delay to produce a total delay of $$(\tau_a)'_{max} = 2(\tau_a)_{max}. \tag{3}$$

The illustrative all-pass circuit of FIG. 5 comprises a through path 50, a feedforward path 53, and a feedback path 54. The through path includes a first delay line 51 and a signal combiner 52. The feedback path 54 includes a second delay line 55. The feedback path and the feedforward path are coupled, respectively, to the negative and positive ports of a differential amplifier 56. The output of the latter is coupled through an attenuator 57 to signal combiner 52 along with the output from delay line 51, wherein they form the output signal $V_o(\omega)$.

The transfer function $h(\omega)$ of the all-pass circuit of FIG. 5 is $$h(\omega) = e^{-j\omega T_i} \frac{1 + \alpha_i e^{j\omega T_i}}{1 + \alpha_i e^{-j\omega T_i}} \tag{4}$$

where $T_i$ is the delay through delay lines 51 and 55; and
$\alpha_i$ is the attenuation gain factor ($\alpha_i < 1$).

To provide effective delay equalization, the all-pass circuits are advantageously spaced across the band at intervals of four to five megahertz. The oscillator is controlled so that it shifts the fade notch frequency, if it is within band, to the equalizer center frequency. If the fade notch is outside the band, the equalizer center frequency will be located at a band edge. Thus, in order for the delay bumps to extend across the entire channel when the equalizer center frequency is at a band edge, the delay bumps must cover a frequency range that is twice the channel bandwidth. Accordingly, for a 20 MHz channel, nine all-pass circuits would be used if the spacing is 5 MHz, or eleven sections if the spacing is 4 MHz. For a 30 MHz channel, 13 or 17 sections would be employed.

The delay per all-pass section is given by $$\tau_i = \frac{-2\alpha_i T_i(\cos\omega T_i + \alpha_i)}{1 + 2\alpha_i \cos\omega T_i + \alpha_i^2} \tag{5}$$

The peak delay occurs when $$\omega_p = (2n-1)\pi/T_i. \tag{6}$$

At this frequency, the delay is $$(\tau_i)_{max} = \frac{2\alpha_i T_i}{1 - \alpha_i}. \tag{7}$$

EXAMPLE

As an example, let us design a nine section delay equalizer with 5 MHz spacing centered at 140 MHz.

The delay of the center section $T_5$, from equation (6), is $$T_5 = \frac{(2n-1)\pi}{2\pi \cdot 140 \cdot 10^6}$$

or $$T_5 = 3.57(2n-1) \text{ns}. \tag{8}$$

Using the second delay peak (n=2), equation (8) gives $$T_5 = 10.7 \text{ ns},$$

which is a value that could be readily obtained in a commercial delay line. Typical values for $T_i$ at 120 and 160 MHz are $T_1 = 12.5$ ns and
$T_9 = 9.375$ ns.

Typically, delay values of multiples of 10 ns are commercially available. Odd delay values would have to be specially ordered.

Having selected the delay lines for each of the all-pass sections, the attenuator gain factors $\alpha_i$ for the sections are selected such that the delay for each section is equal to the maximum delay at midband, as given by equation (3). Thus, from equations (7) and (3), we obtain $$\frac{2\alpha_i T_i}{1 - \alpha_i} = \frac{2\alpha_a T_a}{1 - \alpha_a} \tag{9}$$

or $$\alpha_i = \frac{\alpha_a T_a}{(1 - \alpha_a)T_i + \alpha_a T_a}. \tag{10}$$

I claim:

1. An adaptive equalizer comprising in cascade:
an amplitude equalizer circuit (12), having an amplitude bump frequency, and a plurality of n+1 all-pass circuits (14,15), each having a delay bump frequency;
the input port of the first of said cascade of circuits (12,14,15) constituting the equalizer input port, and the output port of the last of said circuits constituting the equalizer output port;
controller means (18), responsive to the relative amplitudes of selected frequency components within the equalizer output signal, for adjusting the magnitudes and bandwidths of said amplitude and delay bumps and the frequencies of said amplitude and delay bumps;
said controller means (18) further controlling the number of all-pass circuits in said equalizer in response to the output of an error rate monitor (17) connected to the output port of said equalizer.

2. The equalizer according to claim 1 wherein said amplitude equalizer circuit (12) and said all-pass circuits (14,15) are embedded in a frequency-conversion system comprising:
a first frequency converter (11) at the input of said equalizer;
a second frequency converter (16) at the output of said equalizer;
and a common local oscillator (19) connected to both of said converters.

3. The equalizer according to claim 2 wherein said bump frequencies are varied relative to the signal frequencies by changing the frequency of said local oscillator.

4. The equalizer according to claim 1 wherein the number of all-pass circuits is varied between $n$ and $n+1$ where $n$ is an integer.

5. The equalizer according to claim 4 wherein the $n+1$st all-pass circuit (15) is switched in and out of said equalizer by said controller (18);
and wherein the frequency of said amplitude equalizer circuit (12), and the bump frequency of said switched, n+1st all-pass circuit (15) are the same.

6. The equalizer according to claim 1 including a plurality of bandpass filters and detectors (9) for sampling selected frequency components within the equalizer output signal, and for coupling said sampled components to said controller (18).

7. The method of equalizing the amplitude and delay distortion of a signal over a given band of interest by means of an amplitude equalizer circuit having an amplitude bump frequency, and a plurality of all-pass circuits, each having a delay bump frequency, comprising the steps of:
sampling the signal power within a plurality of selected portions of the equalized output signal;
comparing the magnitude of the sample nearest the amplitude bump frequency with the average of all the other samples;
making amplitude comparisons between selected pairs of said samples;
varying the magnitude and bandwidth of said amplitude and delay bumps and the frequencies of said bumps in response to said power comparisons;
and measuring the bit error rate of the equalizer output signal and changing the number of all-pass networks in said equalizer whenever the measured error rate exceeds a specified threshold.

* * * * *